United States Patent
Quint (10) Patent No.: US 8,868,438 B1
(45) Date of Patent: Oct. 21, 2014

(54) WEB-BASED COMPUTER-SUPPORTED WORK ORDER AND SPECIFICATION MANAGEMENT PROCESS

(75) Inventor: Joe B. Quint, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2937 days.

(21) Appl. No.: 10/945,229

(22) Filed: Sep. 20, 2004

(51) Int. Cl.
*G06Q 10/00* (2012.01)

(52) U.S. Cl.
USPC .......................................... 705/7.11; 705/1.1

(58) Field of Classification Search
USPC ................................................ 705/1.1, 7.11
See application file for complete search history.

(56) References Cited

U.S. PATENT DOCUMENTS

| | | | | |
|---|---|---|---|---|
| 5,189,606 | A | * | 2/1993 | Burns et al. ..................... 705/10 |
| 6,324,508 | B1 | * | 11/2001 | Finney ......................... 704/246 |
| 6,446,053 | B1 | * | 9/2002 | Elliott ........................... 705/400 |
| 7,315,826 | B1 | * | 1/2008 | Guheen et al. ............... 705/7.29 |
| 7,930,149 | B2 | * | 4/2011 | Haag et al. ....................... 703/1 |
| 2003/0023533 | A1 | * | 1/2003 | Tan ............................... 705/36 |
| 2003/0033179 | A1 | * | 2/2003 | Katz et al. ........................ 705/7 |
| 2005/0026119 | A1 | * | 2/2005 | Ellis et al. ..................... 434/219 |

* cited by examiner

*Primary Examiner* — Thomas L Mansfield, Jr.

(57) ABSTRACT

A method, system, and medium are provided for automating the work order and specification processes for engineering projects. All documentation is generated, saved, and retrievable over the web according to an identifier. The application is accessible through the user's web browser and is thus available to authorized users irrespective of physical location. The method also consolidates two traditionally separate work order and specification processes.

10 Claims, 5 Drawing Sheets

POTENTIAL RECIPIENTS 410
{ OUTSIDE PARTY, SUPERVISOR, MANAGER, ENGINEER }

412 { UAP, NRL, REL, ASB, ARC }

| | ENGINEER | MANAGER | SUPERVISOR | OUTSIDE PARTY |
|---|---|---|---|---|
| UAP | x | | x | |
| NRL | x | x | x | x |
| REL | x | | x | |
| ASB | x | x | x | x |
| ARC | x | x | x | x | x — WILL RECEIVE NOTIFICATION/ SOLICITATION/DISTIBUTION AS THE CASE MAY BE

WEB-BASED COMPUTER-SUPPORTED WORK ORDER AND SPECIFICATION MANAGEMENT PROCESS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer programming. More particularly, the present invention provides a new and useful method for work orders and specifications for engineering projects.

BACKGROUND OF THE INVENTION

The term "work order" is known in the engineering field as the documentation authorizing a project. It describes the project—both technically and financially. It is a unit of work for which a certain number of dollars have been authorized with respect to an existing or potential project at a designated site. When created, a work order is normally assigned an identifier. Those in the field refer to this as the "activity number."

Work orders oftentimes comprise vast paper documentation containing information. This information includes, e.g., what work is going to be done, why, and how much the project will cost. Also included is identification of exactly what entity will be performing the work, and where. A work order will also usually contain scheduling information. For example, it will include information on when certain items must be paid for, and when work is scheduled for completion.

The work order is normally implemented once a written request has been received which authorizes the project. Next, it provides information indicating what work will be required to complete the project. Finally, it is used to monitor the billing necessary, and also to issue a final bill once the project is completed.

A separate process regarding an engineering project normally coexists. This second process involves additional documentation referred to as the project's "specification." Each project will typically have both a work order and a separately maintained specification.

A specification is an exact and specific bill of particulars for the project. It describes the materials, exact dimensions, and workmanship for the thing that is being installed, built, or manufactured as part of the project.

The two processes, though separate, overlap considerably in areas. Nevertheless, the two have completely different process states. With the traditional work order process, the initial state is referred to as the "unapproved state." At this point in the process, the scope of work is developed, scheduling occurs, team members are designated, finances are estimated and forecast, among other things. The next state in the work order process known as the "approved state." This is the point of time in the process where the appropriate parties have given the proper authorization of the work order. After approval, the next state of the work order process is referred to as the "in service." This occurs when the work associated with the project is completed. After the in service stage of the process, the next state in the traditional process is referred to as the "pre-closing" state. This state involves accounting, financial and other post-project wrap-up measures. Purchase orders are forbidden, depreciation is begun, and further charges are prevented from hitting the work order. In the final state change, the work order is officially closed.

The traditional specification states include the not released (NRL), released from engineering (REL), as built (ASB), ABESA, and archive (ARC). These states mostly occur at the same time as each of the steps in the work order process, but they are maintained on a completely separate track. Because of this two-track prior-art arrangement, resources are wasted because many of the steps of each are duplicative. It also makes cross-communication between the finance-side persons typically participating in the work order process, and the engineering types normally more closely affiliated with the specification process unacceptably rare. This lack of communications can lead to business mistakes, and also makes document sharing difficult.

Historically, both the work order and specification processes have been time-consuming and resource-intensive. Typically, work order and specification documents have been created using a variety of software programs. These software programs create native documents. For other persons to view documents electronically that were created in certain applications, those people must have the respective native applications installed on their computers. If someone created a document in WordPerfect® for example, then those persons wishing to view the document must have WordPerfect® installed on their computers.

After the work order and specification documents have been generated in various native applications, the documents are printed and manually assembled.

With respect to the specification, e.g., if multiple parties are responsible for generating the document, then those parties must manually conglomerate their documents to create an engineering specification. Thus, if a first person in New York is responsible for generating engineering drawings, and a second person in Texas is responsible for creating an implementation schedule, then those documents must typically be mailed to each person to create a complete engineering specification. This process must be performed for as many persons that are in geographically disparate locations.

The work order side of the process also has these disadvantages. If a finance person at one location is responsible for suggesting cost adjustments, and a group of other persons in a plurality of other locations are responsible for approval of cost adjustments, the painstaking and time-consuming task of creating and then mailing the cost-adjustment paperwork to the plurality of approvers will be required.

With respect to both the work order and specification processes, copies of documentation must be provided for numerous individuals working in connection with the specific project. For example, if a team includes one manager, five supervisors, and ten engineers, then sixteen copies of the specification must be generated. Some of the documents involved may be hundreds of pages long. Specifications may be bound after being copied. The copying and binding process can contribute considerable expense and time to these processes. The costly copies must then be disseminated to the various parties of interest.

The delivery process is typically a manual process. It typically relies on conventional mailing means such as the United States Postal Service or a courier service such as that offered by Federal Express®. The engineering specifications and sensitive financial information included in work orders are typically of a sensitive, confidential nature, which can be compromised by having to use a conventional mailing service. Significant costs are often associated with the mailing and dissemination process.

Another problem is the separateness of the work order versus specification processes. Individuals often need documentation related to each. Because of lack of communications, it may be difficult for a person to determine what stage each process is in. It may also be difficult to locate the proper documentation. For example, the specification and work order documents may be saved on different computers in a local area network (LAN). The interfacing necessary to obtain the necessary documents will occur between separate computers on the system, or occur between individuals directly. There is no common interface, or portal, which may be relied on to submit or obtain the proper versions of the documents needed.

The present state of the art can be improved by providing processes which are less resource-intensive, do not rely on a conventional mailing system, and does not require paper to be generated. Also needed is a process that does not involve an indefinite system of obtaining the appropriate documentation relating to both processes.

SUMMARY OF THE INVENTION

The present invention solves at least the above problems by providing a web-based system and method which consolidates the work-order and specification processes.

In one aspect, the present invention provides a method and system for electronically managing the documents involved. The documents are generated, saved, and retrievable over the web. They are easily distributed in digital format. Online collaboration is used to incorporate changes.

References to the proper documents may be maintained on a plurality of web client's computers. Storing references to the documents—instead of the documents themselves—consumes substantially less storage space and speeds up the searching process that may be associated with having to find a work order document or the specification. Approval can be facilitated automatically, irrespective of the physical location of the person from whom approval is required. Thus, if a manager or supervisor is at a remote office, then the manager will be able to remotely view the documents needing approval from almost anywhere in the world—wherever there is an Internet connection—and grant approval, substantially reducing individual approval times.

The process also consolidates the traditional state changes from both of the work order and specification processes. This has been done by assigning common identifiers to the states in the two processes that are substantially the same and retaining the steps that the two processes do not have in common.

Once a state change occurs, a designated list of recipients will be notified. Different recipient groups for notifications regarding various state transitions associated with the approval process. That is, upper-level managers can be sheltered from lower-level state changes. Moreover, if third parties or entities external to a corporation need to be notified, this can be accomplished via a distribution matrix—described in detail below.

In another aspect of the invention, an interface is provided to interact with a conventional document management system or version control system. This interface, in one embodiment, is provided over the web (or application) server. Input data is received over a web page to create documentation for the specification and work order. This web-based interface is then used to enable authorized persons to obtain work order and specification documents from a common interface.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a web-based work order and specification processing method and system which creates a paperless environment, and enables the combination of the two traditionally separate processes. Rather than relying on paper copies, manual assimilation, slow mailing systems, and costly duplication processes, the present invention enables many actors to participate in the two now-combined processes in a geographic-independent forum. The present invention substantially reduces the time and cost historically associated with the conventional processes.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on a computer-readable medium.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Combinations of the above are included within the scope of computer-readable media.

As previously mentioned, the present invention is, among other things, a computer-program product that includes instructions to electronically facilitate the work order and specification processes.

Figure 1:
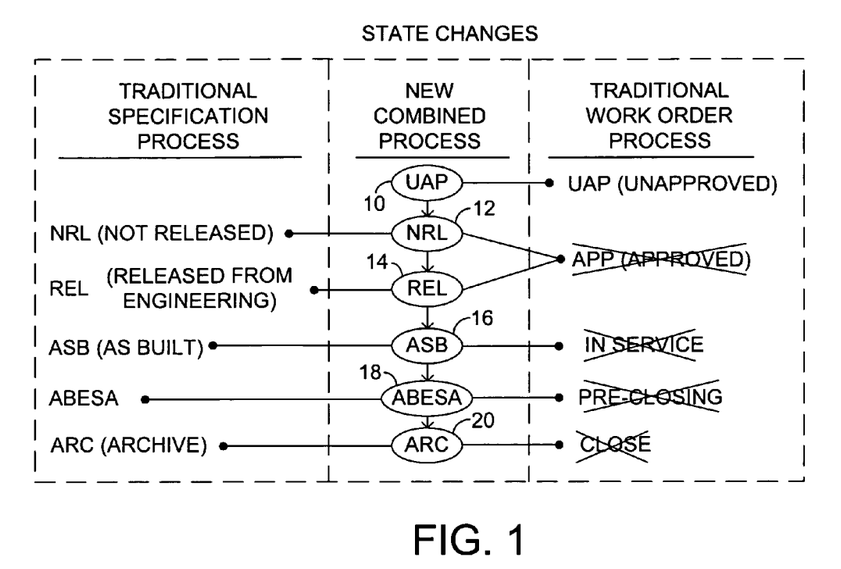
FIG. 1 is a diagram showing the way in which the state changes of the conventional work order and specification processes have been morphed into a new list of state changes of the process of the present invention.

Exemplary embodiments of the present invention are shown in FIGS. 1-4. Referring first to FIG. 1, disclosed is a table showing three columns of state changes. The purpose for this table is to show how similar or duplicative state changes from the conventional specification and work order processes have been consolidated into one process. The column on the left shows the conventional specification process state change steps. The column on the right shows the conventional work order state change steps. The middle column comprises the state changes which have been either adopted from one of the two traditional processes or consolidated between two similar and/or duplicative state changes.

As already mentioned above, the two conventional processes, though separate, overlap considerably in areas. The present invention eliminates the duplicative nature of the conventional separate systems and combines them into a single process. In the situation where both traditional processes each have a particular state change that is comparable, or substantially the same, these two state changes are morphed into one in the new consolidated process. In the circumstance in which only one of the sides of the process has a particular step and the other has nothing similar, that unique step is included in the state changes of the new process.

FIG. 1 shows how this has been done. Referring first to the traditional work order process on the right side of the FIG. 1 table, we see that the first listed state is referred to as the "unapproved state" designated as UAP 10. This is the state in which the work order is initially created. At the UAP state of the process the scope of work is developed, scheduling occurs, team members are designated, finances are estimated and forecast, among other things. Looking to the left hand specification column, we see that there is no real equivalent to this state in the traditional specification process. Thus, this step is included in our combined process as shown.

The next state in the work order process known as approved state (APP). This is the point of time in the process where the appropriate parties have given the proper authorization of the work order. Looking across to the opposite side of the chart, we see that two states, the not-released-from engineering state (NRL) and the released from engineering state (REL) have both been matched up with the APP state in the traditional work order process. The work order APP process is very similar to the combination of the NRL and REL states of the specification process. Therefore, the new combined process has adopted NRL 12 and REL 14 states, and cancelled the APP state from the process, since is sufficiently covered by the retained state changes.

After approval, the next state of the work order process is referred to as the "in service" state. During this state financial, inventory, and provisioning records are updated. This occurs after the work associated with the project is completed. The timing of this state parallels the state in the specification project called the "as built" (ASB) stage. Because these steps are closely related in terms of timing and substance, they have been combined into an ASB stage 16 in the combined process shown in the center of FIG. 1.

After the in-service state, the next state of the traditional work order process is referred to as the "pre-closing" state. At preclosing, purchase orders are forbidden, depreciation is begun, and further charges are prevented from hitting the work order. This state involves accounting, financial and other post-project wrap-up measures. With the traditional specification process, an ABESA state change occurs at the same time and have substantive similarities. Therefore, these two states have been morphed into one ABESA state 18 in the combined process.

The final state change of the traditional work order process is referred to as the "closed" state, and as it indicates by its plain meaning, represents the stage of the process in which the work order is financially, and otherwise closed. The specification equivalent to this stage is referred to as the archive (ARC) state. Thus, this identifier has been retained in the combined process as representative of both the closed and ARC steps.

Figure 2:
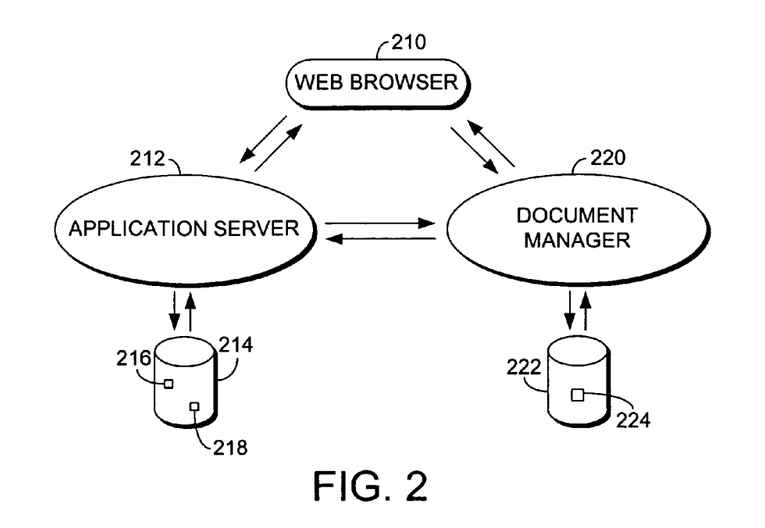
FIG. 2 is a diagram depicting a suitable operating environment for practicing the present invention at a high level.

FIG. 2 depicts a schematic diagram of one environment in which the processes of the present invention may be practiced. This environment comprises in one aspect web-support for the combined work order/specification process. For this support, any web browser 210 may be used to access an application server 212. The application server 212 save work order data 216 and specification-related data 218 on a database 214. Database 214 may be a common or separate databases. Also optionally included with this arrangement is a document management system 220 which is associated with a separate document management database 222. Document management systems like that manager 220 typically have version controlling software. The manner in which documentation is versioned using such arrangements will be known to those skilled in the art.

Though the FIG. 2 embodiment shows the use of a web-based system, it is also possible to practice the present invention using some other kind of networking arrangement. E.g., with another network-computing environment such as a Local Area Network or a Wide Area Network.

Figure 3A:
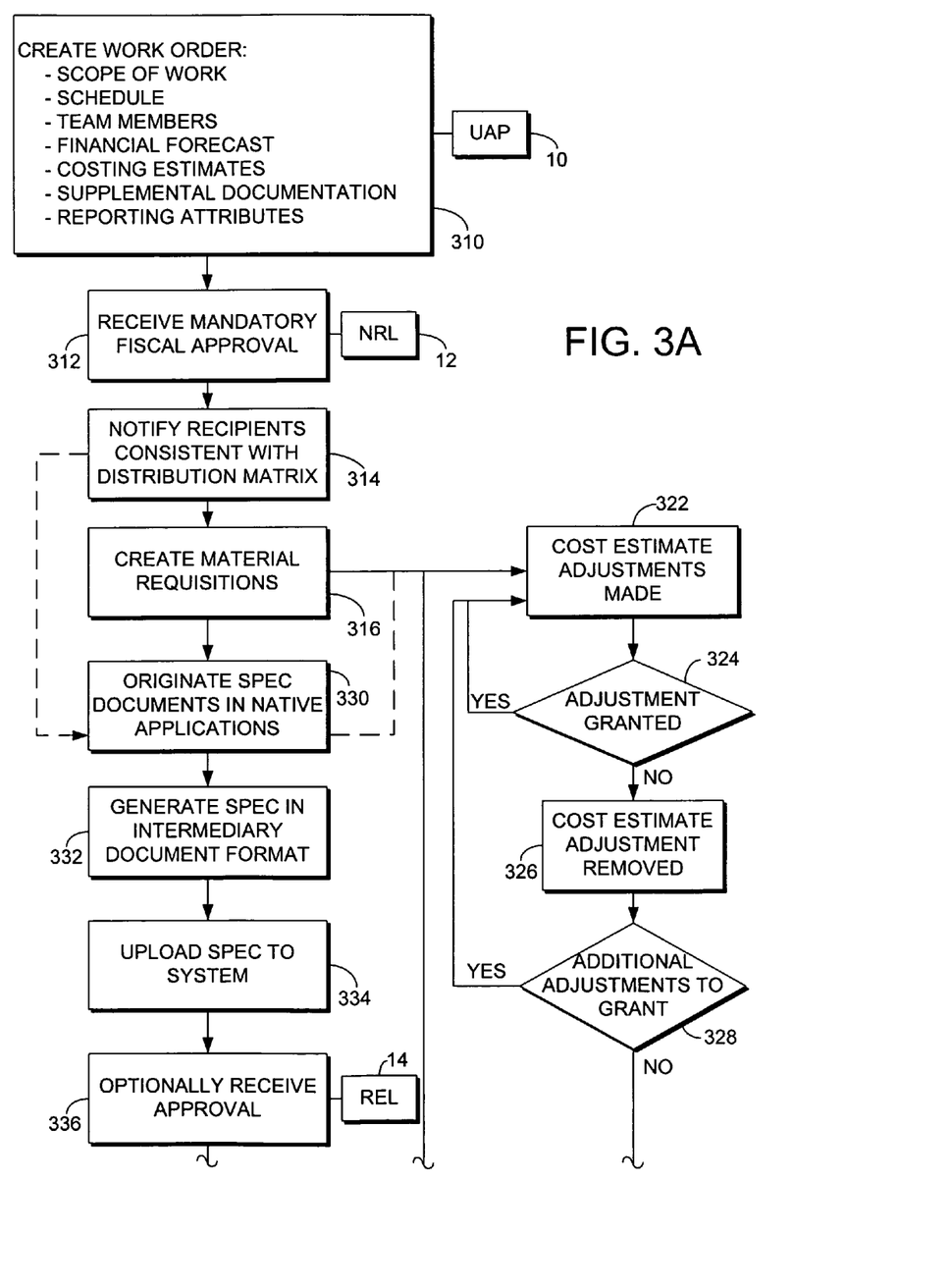
FIGS. 3A-C comprise a flow diagram illustrating an exemplary embodiment of the present invention.
Figure 3B:
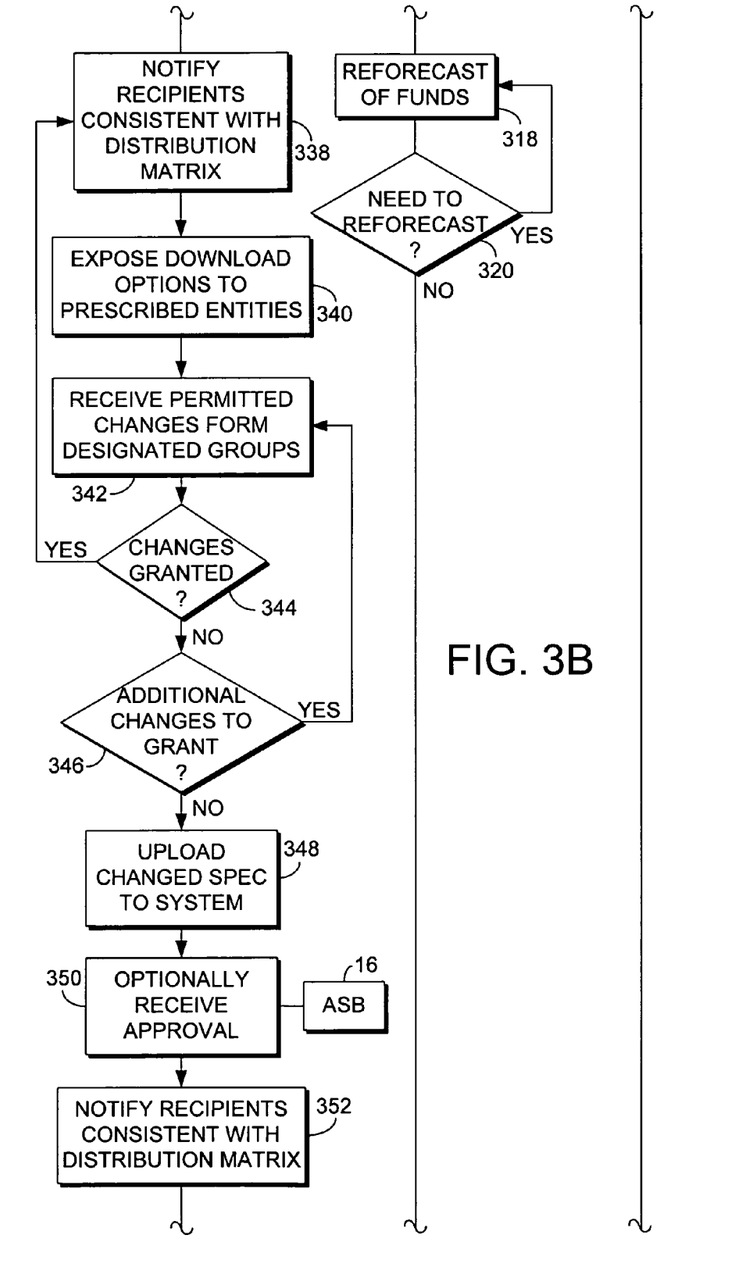
Figure 3C:
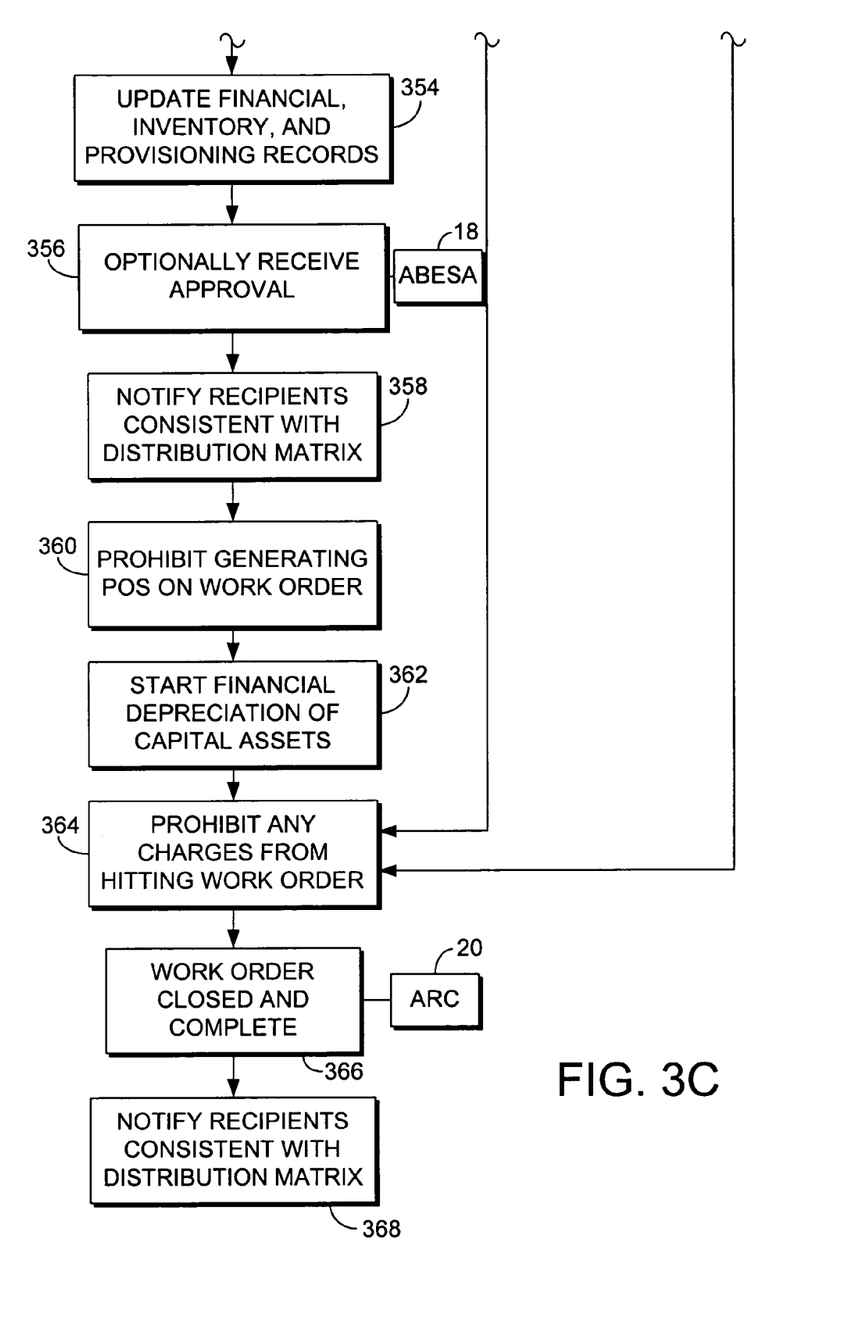

The flow chart comprised of FIGS. 3A-C represents an illustrative method for practicing the present invention. The steps in FIGS. 3A-C should not be construed as limited to the order shown or as requiring each step illustrated. Rather, FIGS. 3A-C are provided to illustrate an exemplary method for providing the functionality offered by the present invention.

A first step 310 is begun at the initial unapproved (UAP) state 10. During this step, the work order is created. The contents of the typical work order will be known to those familiar with the planning and financing of engineering projects. Here, however, the work order it prepared over the world wide web. This is accomplished by running an application on an application server, e.g., application server 212 in FIG. 2, which has a database, e.g., database 214, associated with it to save the necessary documentation. This enables designated parties to access the electronically recorded documentation using a web browser. The user will normally have to log into the application using secure ID information in a manner well known to those skilled in the art.

Traditionally, these work orders comprised vast paper documentation containing information. Here, however, because the documentation is stored electronically and web accessed, no paper documentation is required.

The work order may be initiated in a number of different ways. One way is as the result of a high-level project authorization in the company. E.g., the companies vice president signs off on a group of projects. The projects authorized will include the installation of a number of telecommunications switches in a number of cities. For example, the task of installing one of these switches in one of the locations might be the subject of a particular work order. The work order could also come about as the result of a high-level planning document—e.g. a single letter from a person or group of authority authorizing, e.g., the installation of a telecommunications router in St. Louis. In any case, before the documentation associated with the work order is put together, an activity number will be assigned. This number will be used to identify the work order throughout the entire process.

Once an activity number is assigned to the particular project, the work order is ready to be entered into the system of the present invention. The number will be used to associate all the documentation created online. The web pages displayed to the user throughout the process will all include the identifying activity number. Referring to FIG. 3A, a first step 310 involves the creation of the work order. This occurs when the work order is in unapproved, or UAP status 10. At this point, a scope of work, work schedule, team members, financial forecast information, cost estimates, reporting attributes, and any supplemental documentation are all entered into the system over a web browser. This may, thus, be done by anyone having access to the internet.

Using web browser 210 to access application server 212, the application of the present invention enables the user to enter information regarding the scope of work into database 214 of the present invention. More specifically, the information will be saved into, and retrievable from a directory 216 (or directories) designated for the storage of work-order related information.

With respect to the scope of work, the user will include via a web page what work is going to be done, exactly what entity will be performing the work, and where. An example scope of work might read: "[t]his project is to fund the addition of a DMS 100 switch to the existing equipment in our Lenexa Kans. facility."

By navigating to another web page, or alternatively on the same web page, the user may enter the work schedule. This would entail the start and end dates for the project, as well as other dates of significance.

Team members may also be added using the same web page, or by navigating to another web page. Team members may be individuals not closely associated with a work order, but added by default (though a template). Alternatively, they might be persons intimately associated. In either case, the web page of the preferred embodiment allows the entry of the team members name, user ID, phone number, email address, and status (as "active" versus "inactive"). Toggles are provided for adding, deleting, or editing the profiles for members.

The projected costs for the project are entered onto another web page. On this page, the user itemizes the projected expenditures associated with the project. For each expenditure, account information, an item type, a description of the item, a quantity, and a unit price may be entered to create a cost-model component for the work order. In the preferred embodiment, each line automatically multiplies the cost per unit times the number of units. Cost adjustments may also be made to the work order using this screen.

Another web page (or alternatively the same web page) is used to receive financial forecasting information. The creator of the work order will likely have at his or her disposal information regarding when certain costs will hit the work order. To manage this, a separate web page is provided which enables the user to enter account information, projected expenditure dates, and projected amounts. At another place on this same web page is provided in which the user may add to, modify, or delete the already-projected forecast information.

Figure 4:
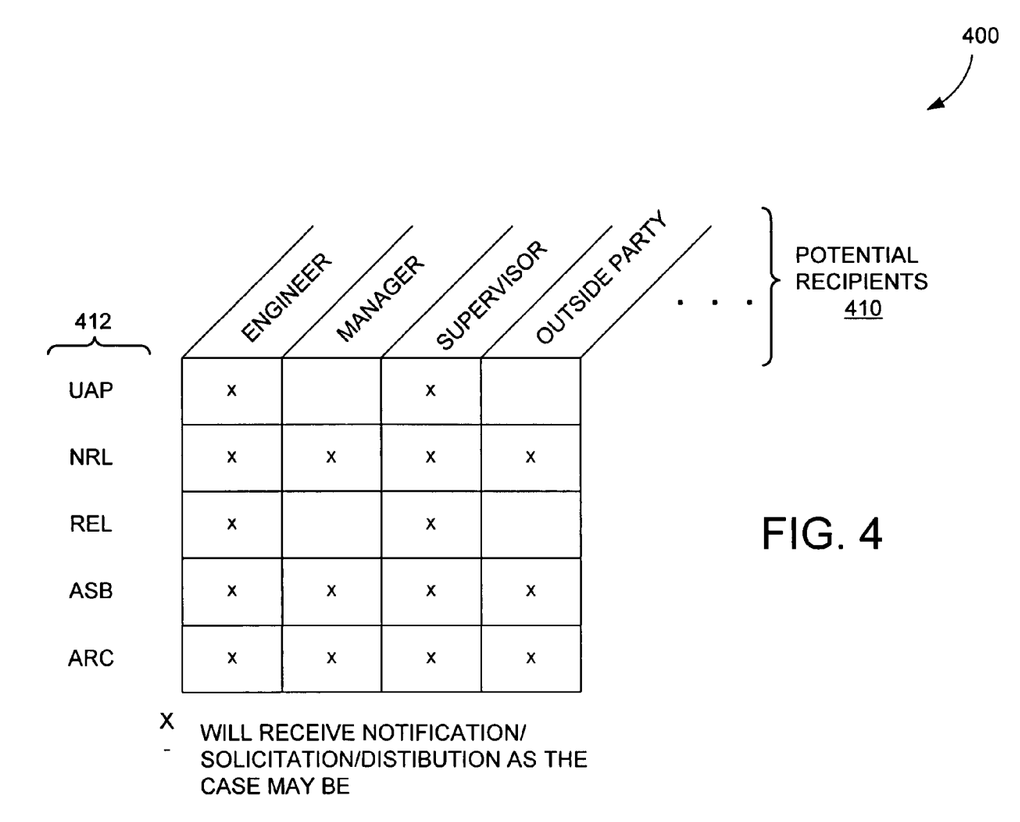
FIG. 4 is an exemplary distribution matrix that helps determine entities to be notified at different state changes throughout the combined work order and specification process of the present invention.

Reporting attributes are also added in the online creation of the work order. With most projects, the list of individuals needed to be notified of a particular state change, e.g., the process has moved from the UAP state to NRL, will be a different list of persons that would be notified of a different state change, e.g., that the process has moved from ASB to ARESA. Therefore, the process of the present invention allows a user to create a distribution matrix which will specify which persons will be notified of which event. An example of such a distribution matrix is shown in FIG. 4.

By using a distribution matrix, the present invention is able to control dissemination of information in connection with the work order. Distribution matrix 400 allows for the control of distribution and notification during certain steps of the work-order process. In a preferred embodiment, certain potential recipients 410 are notified after prescribed state changes 412. An exemplary set of state changes are shown along with FIGS. 3 A-C. These states, UAP, NRL, REL, ASB, and ARC, have been gleaned from the FIG. 3 process in order, then disposed in the vertice of FIG. 4. This is shown by way of example. Other states could, of course, be used instead and still fall within the scope of the present invention. FIG. 4 depicts five exemplary states. Tens or even hundreds of states could be provided, however.

Returning to FIG. 4, it can be illustratively seen that at the initial UAP state, the engineers and supervisors are notified, as reflected by an "X" in the respective potential-recipients column. When the process moves on to the NRL state, all engineers and supervisors are notified in this example. At the next state change, from NRL to REL, perhaps only the engineers and supervisors are notified again when the work order is released to engineering. a new eSpec 110 is uploaded. Upon arrival at the fourth state of the process, ASB, it can be seen that all four groups of potential recipients are notified. This is also the case when the process moves to ARC. Being able to control dissemination of information in this manner greatly increases the efficiency and security of the process.

Now that the work order has been completed online, the work order is presented for mandatory approval in step 312. Once the necessary approval is granted, the state of the process changes to the NRL status 10. Upon this state change, the appropriate notifications go out to the recipients noted in FIG. 4. This notification (via email) may include only a simple expression that the work order has been approved, but that the project has not been released from engineering. But more likely is that the email will include a link to the work order so that the notified party may observe the approved work order.

Once these notifications have been transmitted, the process can optionally move on to a step 316 in which material requisitions are made, or on to a step 330 in which the specification documentation is originated in native applications. In actuality these two steps may occur in any order or at the same time. Regardless, however, a financial forecasting adjustment process comprising steps 318 and 320 (see FIG. 3B), and a cost adjustment process comprising steps 322, 324, 326, and 328 (see FIG. 3A) are provided. Each of these processes may occur simultaneously, but are not conducted in any concert with the work order/specification processes disclosed in steps 330, 332, 334, 336, and so on.

With respect to financial forecast adjustment process which may be seen in FIG. 3B, step 318 enables the reforcasting of funds if this is deemed necessary in inquiry step 320. This may occur if, say for example, the work order initially represented that a piece of telecommunications was not delivered on schedule. Because of the delay, the costs estimated for its purchase will hit the work order at a time much later than projected. In this circumstance the user will have to change the forecasting information originally entered. To do this, the user simply navigates back to the same screen in which the original forecasting was entered as part of the work order. A separate area is provided in which amendments can be made. Alternatively, a completely separate web page could be provided to make financial forecast changes. Regardless, the application server 212 is accessed and the changes recorded in the database 218 associated with the application server 212. All forecasting-adjustments will end at a step 364 in which any new charges are prohibited from hitting the work order.

The cost-adjustment process of steps 322, 324, 326, and 328 enables, in step 322, the user to make any changes necessary in the cost estimates set forth in the work order. All of these adjustments, in the preferred embodiment, are entered into the same web page provided for the original cost estimates input in the work order creation step 310. Other arrangements for entering the changes could be used as well, however. Any adjustments typically require approval by some authorized person or persons. Thus, step 324 takes this into account. If the necessary approval is granted, the adjustment made in step 322 will stand. If not, it is removed in step 326. Before the overall FIG. 3 process is complete, an inquiry will be made as to whether additional adjustments remain to be granted. If not, the forecasting process is essentially closed when any further charges are prohibited from hitting the work order in step 364 (see FIG. 3C).

Independently from the financial forcasting and cost adjustment tracks of the FIG. 3 process, the specification-related steps of the process will occur.

At a step 330, an engineer originates documents in various native applications. Native applications may include any application that is used to originate a native document. At a step 332, an electronic copy of the specification, or an "eSpec" is generated. The eSpec is preferably created in an intermediary document format (IDF) whereby the documents produced by various native applications can be aggregated, viewed, and printed using a common application. More specifics regarding how the eSpec is generated and used may be found in U.S. patent application Ser. No. 10/458,852 filed Jun. 11, 2003 entitled ELECTRONIC DOCUMENT-APPROVAL PROCESS by the same inventor as this application. The contents of this prior application are herein incorporated by reference.

At a step 334, the eSpec is uploaded to the system from a document management system 220. In the preferred embodiment, web browser 210 is used in connection with an HTTP request to upload the eSpec to the system. The document can then be wrapped in an XML wrapper and communicated to application server 212, which allows a document manager (server) 220 to store the uploaded eSpec in an associated database 222. Document manager/server 212 then passes a reference to the eSpec back to application server 212. Server 212 then stores the reference in database 214.

At an optional step 336, approval of the eSpec 110 can be received. Approval steps can be added at various places throughout FIG. 3. The completion of this step marks the entry into the released from engineering (REL) state 14 of the process. This state change prompts a new round of notifications. At step 338, prescribed recipients are notified consistent with the distribution matrix of FIG. 4. Referring to the distribution matrix, we see that the persons notified are the engineers and supervisors.

In step 340, the system disclosed in FIG. 2 then makes the eSpec downloadable, or exposes download options, to the prescribed entities at a step 338.

At a step 342, the system receives permitted changes from designated groups. If changes need to be made to eSpec throughout the approval process by various departments of an organization, step 342 provides an avenue to receive such modifications. Thus, if the accounting department needs to add billing information, this can be accomplished during step 342. If engineering drawings need to be redlined or marked up, this also can take place at a step 342 as can a litany of other changes.

At a step 344, a determination is made as to whether the changes offered in step 342 are to be granted. If so, processing reverts to step 338; if not, then a determination is made at a step 346 as to whether there are any other changes to receive. Changes need not be made in a pure parallel or serial fashion. Step 346 provides an additional avenue for modifying the eSpec. If other changes are to be included, then processing reverts to step 342. But if no other changes are to be made, then the changed final version is uploaded to the system in step 348. Once this final version of the eSpec is uploaded, it is ready for approval at what is referred to as the as built (ASB) 16 state of the process. Notifications that this state has been reached are transmitted in step 352 according to distribution matrix of FIG. 4 to the designated parties.

Once these notifications have been made, the financial, inventory, and provisioning records are all updated in step 354 over the web browser. This step is drawn from the traditional work order process. Once these business records are complete and in final form, the work order is ready for final review.

After review, the work order may either be approved, or not. If not, necessary corrections will be made, and the work order resubmitted. If approved as shown in step 356, however, the work order/specification enters into the ABESA state, and notifications are sent out in step 358 in a manner consistent with the distribution matrix, e.g., FIG. 4.

Once the process has entered into the ABESA state, no new purchase orders (PO's) are allowed to be generated on the work order. This is controlled by the application running on the application server 212.

Another accounting-related aspect of the ABESA state is that financial depreciation of the capital assets included in the work order/specification is begun in step 362.

It is after the depreciation-beginning step 362 that the three tracks of the FIG. 3 process—once split apart at step 316 to enable reforecasting and cost-estimate adjustments, are reunited at step 364 which prohibits any further charges from hitting the work order. This effectively terminates the overall combined process. Both the eSpec and work order documentation will be electronically archived on either of databases 214 or 222 if desired. Alternatively, they could be electronically destroyed (e.g., deleted).

This also causes a final state change to the archive (ARC) state of which designated recipients will be notified according to the FIG. 4 distribution matrix.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon that facilitate a method of executing a project, said method comprising:

storing information regarding a plurality of states of said project into said database, wherein said states consolidate engineering work-order states and engineering specification states into a combined process, wherein for each engineering work-order state that corresponds to an engineering specification state, the engineering work-order state and the corresponding engineering specification state are consolidated into a respective single state of said project, wherein said states include,
  A) an unapproved state that corresponds to an engineering work-order unapproved state,
  B) a not-released state that corresponds to an engineering-specification not-released state,
  C) a released state that corresponds to an engineering-specification released state, wherein the not-released state and the released state, in combination, also correspond to an engineering work-order approved state,
  D) an as-built state that corresponds to a consolidation of both an engineering-specification as-built state and an engineering work-order in-service state,
  E) an ABESA state that corresponds to a consolidation of both an engineering-specification ABESA state and a work-order pre-closing state,
  F) and an archive state that corresponds to a consolidation of both an engineering-specification archive state and a work-order closed state;
storing information regarding a first group of individuals authorized to access data associated with a first state into said database, wherein said first state is one of said states of said project;
notifying said first group via an electronic message that said first state has been initiated;
providing said first group with access to a portion of said database, wherein said first group is provided with access to said data associated with said first state;
storing information regarding a second group of individuals authorized to access data associated with a second state into said database, wherein said second state is another of said states of said project;
notifying said second group via an electronic message that said second state has been initiated; and
providing said second group with access to a portion of said database, wherein said second group is provided with access to said data associated with said second state.

2. The one or more non-transitory computer-storage media of claim 1, said method comprising:
storing information regarding a plurality of groups into said database, each of said groups associated with a state in said project;
storing a portion of the information regarding the plurality of groups in a data structure, wherein the data structure is configured as a distribution matrix that specifies associations of said groups with state initiations; and
using said distribution matrix to determine which of said groups to notify of said state initiations.

3. The one or more non-transitory computer-storage media of claim 1, said method comprising:
including in said information regarding said scope of work an indication of one or more of:
what work is going to be done;
how much the project will cost;
an identification of exactly what entity will be performing the work; and
where the project is located.

4. One or more non-transitory computer-storage media having computer-executable instructions embodied thereon that facilitate a method of managing a project, said method comprising:

electronically receiving and storing in a memory job-descriptive information using an application running on an application server, said job-descriptive information including a description of the work required to complete the project;
electronically receiving and storing in said memory information regarding project costs using said application running on said application server;
electronically receiving and storing in said memory a first group of persons associated with said project using said application running on said application server;
electronically receiving and storing in said memory an engineering specification using said application running on said application server;
receiving and storing in said memory information regarding a plurality of states of said project in a course of managing said project,
  wherein said states combine a traditional engineering work-order process that includes engineering work-order states and a traditional engineering specification process that includes engineering specification states into a combined process,
  wherein for each engineering work-order state in the traditional engineering work-order process that corresponds to an engineering specification state in the traditional engineering specification process, the engineering work-order state and the corresponding engineering specification state are consolidated into a respective single state of said project,
  wherein each state of said project is associated with related portions of said job-descriptive information, said information regarding project costs, and said engineering specification, and
  wherein the application provides access to both engineering work-order data and engineering specification data for said states of said project;
electronically notifying said first group that a first state of said project has been reached in the course of managing said project; and
providing said first group with access to a portion of said memory, wherein said first group is authorized to access a portion of information that is associated with said first state.

5. The one or more non-transitory computer-storage media of claim 4, said method further comprising:
storing in said memory information regarding a second group of individuals associated with said project; and
notifying said second group upon reaching a second state of said project in the course of managing said project.

6. The one or more non-transitory computer-storage media of claim 4, said method comprising:
receiving information regarding a plurality of groups, each of said groups interested in a state of said project in said managing of said project; and
using a distribution matrix to notify groups of state initializations.

7. The one or more non-transitory computer-storage media of claim 4, said method comprising:
electronically receiving and storing financial forecasting information using said application running on said application server.

8. The one or more non-transitory computer-storage media of claim 7, said method comprising:
electronically receiving and storing changes to said financial forecasting information using said application running on said application server.

9. The one or more non-transitory computer-storage media of claim 4, said method comprising:
   electronically receiving and storing cost-estimating information using said application running on said application server.

10. The one or more non-transitory computer-storage media of claim 9, said method comprising:
    electronically receiving and storing changes to said cost-estimating information using said application running on said application server.

* * * * *